Inventor
Karl V. Becker
By his Attorney

Jan. 21, 1969

K. V. BECKER 3,422,797

ADHESIVE APPLYING APPARATUS

Filed June 1, 1965

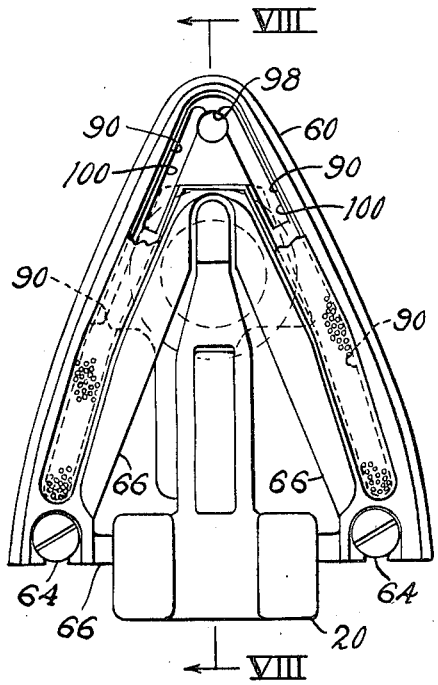
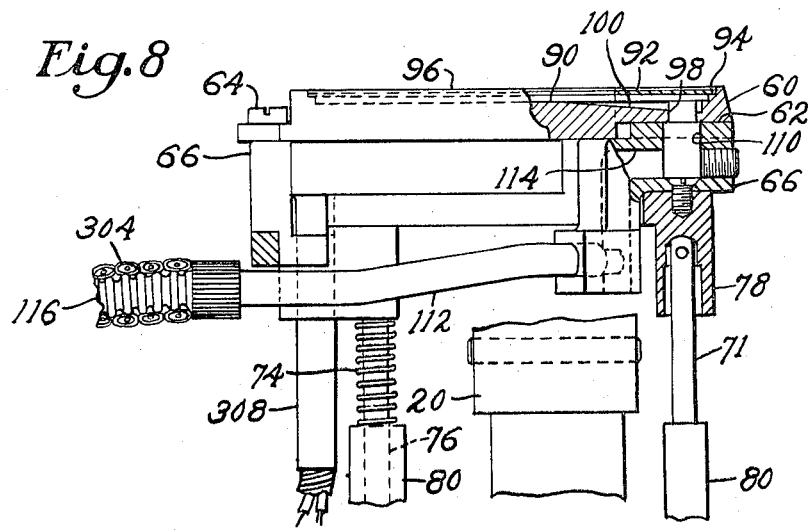

United States Patent Office 3,422,797
Patented Jan. 21, 1969

3,422,797
ADHESIVE APPLYING APPARATUS
Karl V. Becker, Boxford, Mass., assignor to United Shoe Machinery Corporation, Flemington, N.J., a corporation of New Jersey
Filed June 1, 1965, Ser. No. 460,095
U.S. Cl. 118—411    4 Claims
Int. Cl. B05c 3/09

ABSTRACT OF THE DISCLOSURE

An adhesive melting and extruding device and a self-leveling nozzle connected by a heated flexible hose and mounted on a common support movable to engage the nozzle with a shoe bottom in a lasting machine.

---

This invention relates to adhesive applying apparatus and more particularly to a novel and improved apparatus for use in applying molten thermoplastic adhesive to an end portion of the insole of a shoe during the lasting operation. As herein illustrated, the adhesive applying means of this invention is shown as installed in a so-called pulling over and lasting machine of the type disclosed and claimed in United States Letters Patent No. 3,164,852, issued Jan. 12, 1965, in the names of Raymond M. Bowler et al. It will be understood, of course, that the adhesive applying means of this invention is not necessarily limited in utility to use in a lasting machine of the exact type shown in the Bowler patent or to the specific mechanical construction shown.

The principal object of this invention is to provide an adhesive applying means, especially well adapted for use in lasting machines of the general type disclosed in the above-mentioned patent, which is not only relatively simple and inexpensive in construction, but at the same time is highly efficient and dependable in operation. With this object in view, the herein illustrated adhesive applying means, which is shown as installed in a lasting machine of the type here under consideration and having lasting instrumentalities including wipers, a shoe rest for engaging the end portion of the bottom of the insole of a shoe to support the shoe in position to be acted on by the lasting instrumentalities, and a post or similar member on which the shoe support is carried, comprises a nozzle member and means for heating and extruding thermoplastic adhesive through the nozzle and onto the insole, together with means for mounting the nozzle and the heating and extruding means on the post of the lasting machine for movements in unison and relatively to the shoe rest, thus to cause the nozzle to engage the insole of a shoe on the shoe rest, before the adhesive is extruded therefrom and, after extrusion of the adhesive and prior to the operation of the wipers, to move the nozzle away from the insole.

More particularly, the adhesive heating and extruding means includes a heated metallic casing formed to provide a chamber for receiving and melting the leading end of a solid rod of thermoplastic adhesive, an inlet passageway leading into this chamber and a cylindrical bore which is in communication with this chamber and also with the nozzle, a metering plunger in the cylindrical bore, means for feeding the leading end of a solid rod of thermoplastic adhesive into the chamber thus to force molten adhesive from the chamber into the cylindrical bore, and with means for actuating the plunger to force the adhesive through said bore and thence through the nozzle, onto the bottom of the insole, while the means for mounting the nozzle and the heating and extruding means comprises a sleeve which is slidably mounted on the post of the lasting machine, means for supporting the nozzle on the sleeve for universal self-leveling movements, means for rigidly mounting the adhesive heating and extruding means on the sleeve, and a flexible heated hose for connecting the nozzle to the heating and extruding means. Preferably, and in the herein illustrated embodiment, there is associated with the inlet passageway a guiding and sealing means including a body of resilient deformable high temperature resistant material for snugly embracing the solid rod of adhesive as it is fed therethrough and through the inlet passageway into the melting chamber.

The above and other objects and features of the invention will appear in the following detailed description of the embodiment illustrated in the accompanying drawings and will be pointed out in the claims.

In the drawings,

FIG. 1 is a view in side elevation of an adhesive applying device embodying the features of this invention, shown installed on a lasting machine of the type disclosed and claimed in U.S. Letters Patent No. 3,164,852, issued Jan. 12, 1965 in the names of Raymond M. Bowler et al.;

FIG. 7 is a plan view of a nozzle member forming part of the adhesive applying device;

FIG. 8 is a view in section substantially on line VIII—VIII of FIG. 7 and looking in the direction of the arrows.

Figure 1:
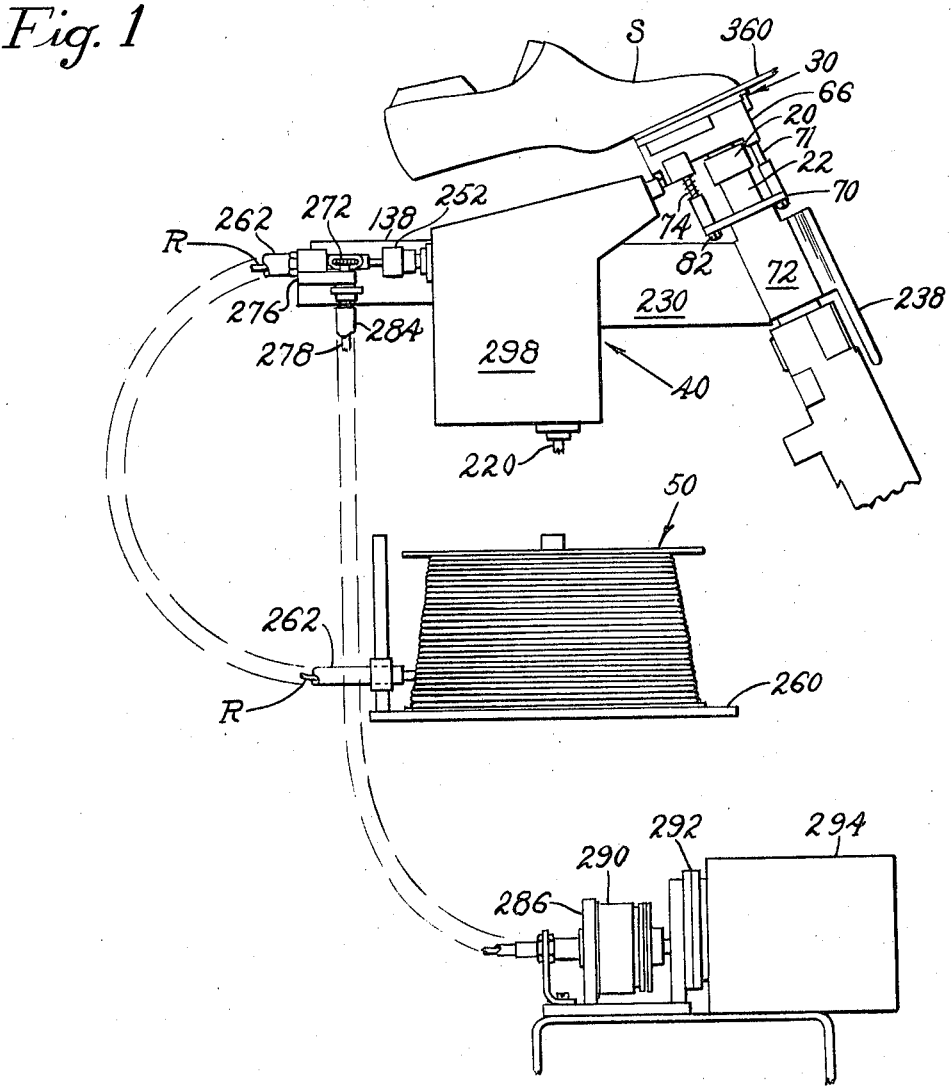
Figure 2:
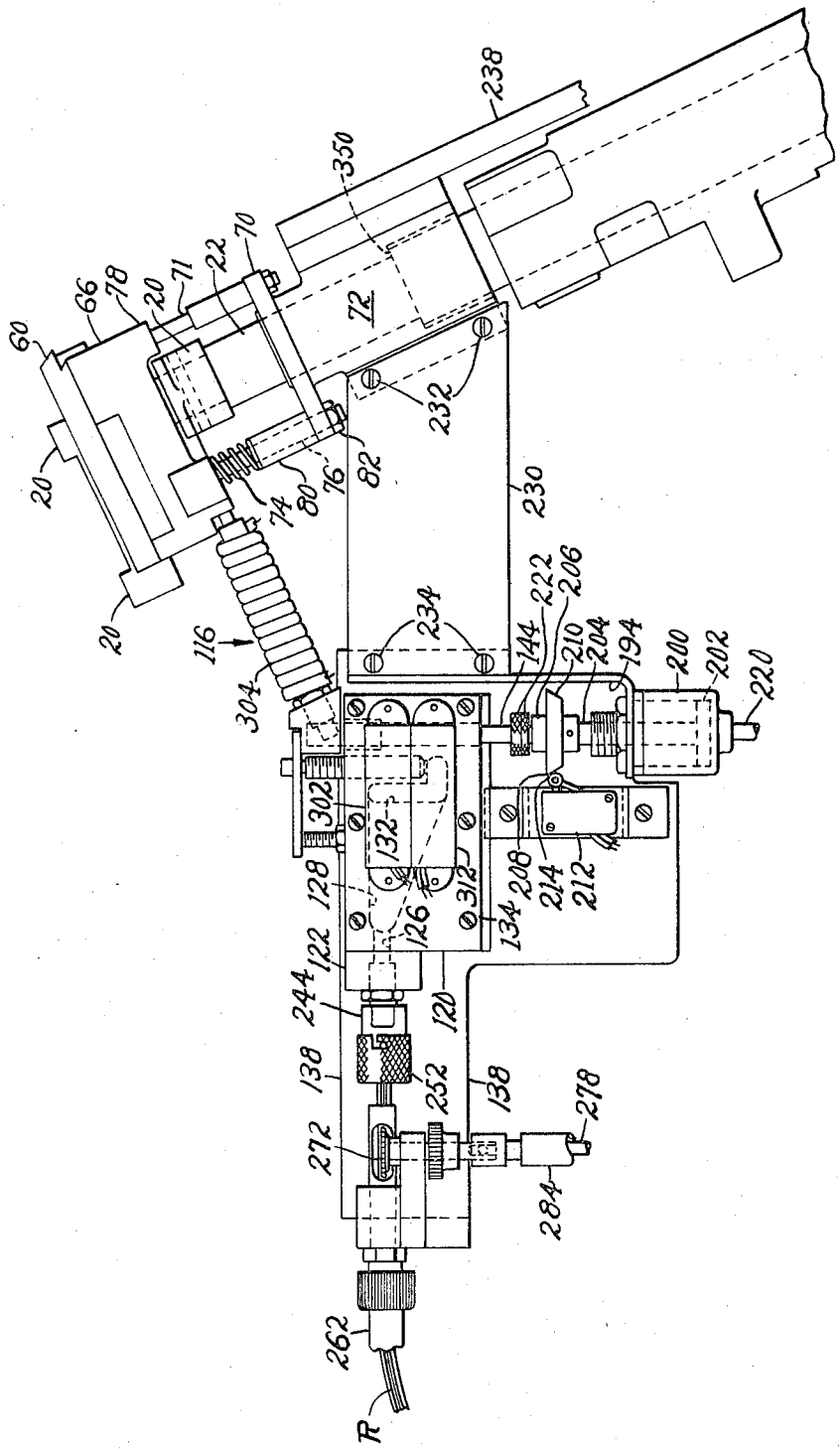
FIG. 2 is a view in side elevation and at an enlarged scale of the principal operating elements of the adhesive applying device.

Referring to these drawings, in FIGS. 1 and 2 the adhesive applying device of this invention is shown as associated with the shoe rest, indicated generally by the reference character 20, of a lasting machine of the type disclosed in the above-mentioned patent, this shoe rest corresponding to the shoe rest 2 of the patented machine. The shoe rest is carried on the upper end of a post 22, corresponding to the post 56 of the patented machine and mounted for heightwise sliding movements in suitable bearings in a manner and for purposes explained more particularly in the mentioned patent. The adhesive applying device comprises a nozzle assembly indicated generally by the reference character 30, a melting and feeding unit, indicated by the reference character 40 and a rod adhesive supply indicated by the reference character 50, FIG. 1.

The nozzle assembly 30 comprises a generally U-shaped nozzle member 60 which is removably secured, by means of a dovetail slide 62 and screws 64, 64, to the upper side of a holder 66, FIGS. 7 and 8. This holder, and the nozzle are supported on the flange 70 of a sleeve 72, for universal self-leveling action by means of a rigid post 71 and coil springs 74, 74 which surround guide rods 76, 76 and are interposed between the lower ends of bosses 78, 78 on the holder and bushings 80, 80, supported on the flange 70 and through which the guide rods extend. At their upper ends the guide rods 76, 76 and the post 71 are loosely fastened to the holder, so that the nozzle 60 can tip, or rock, slightly about the post 71 as a pivot and thus level itself on the bottom of a shoe on the shoe rest 20. Threaded on the lower ends of the rods 76, 76 are stop nuts 82, 82 which serve to limit the upward movement of the holder and nozzle, relatively to the sleeve 72. The sleeve is slidably mounted on the post 22 which carries the shoe rest 20, for a purpose to be explained below.

On its upper side the nozzle 60 is formed with a groove 90, of the shape shown in FIG. 7, and this groove is covered by a perforated plate 92 which rests on shoulders surrounding the inner and outer sides of the grooves. As will be seen in FIG. 8, these shoulders are somewhat deeper than the thickness of the plate so that the plate is spaced a short distance below the upper surface 96 of the nozzle. A vertical bore 98 in the nozzle opens into the groove 90 as do two inclined troughs or grooves 100, 100 which extend to the left away from this bore, as viewed in FIG. 8. The holder 66 is provided with a vertical bore 110 which is in communication with a supply pipe 112 through an angular passage 114 formed in the holder. Extending between this pipe and the melting and feeding unit 40 is a flexible metallic hose 116.

Figure 3:
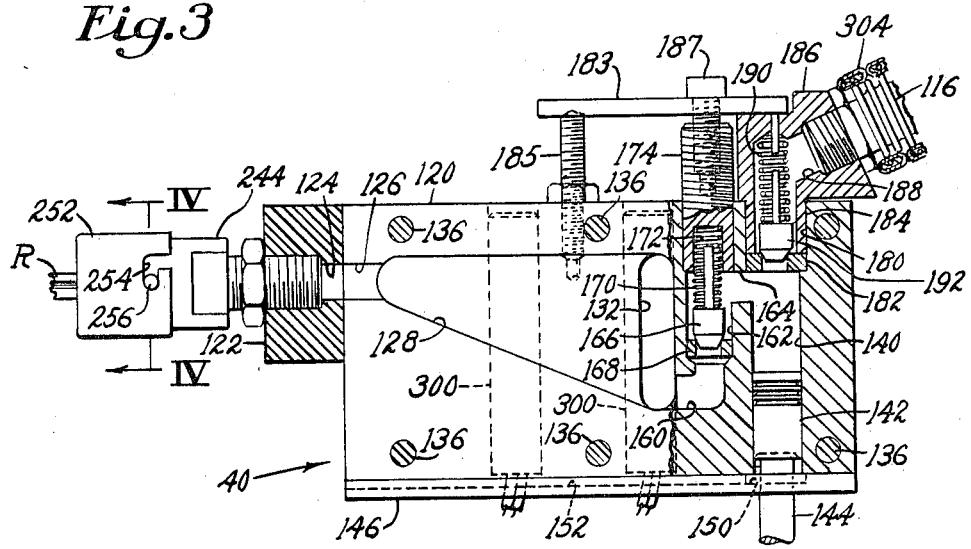
FIG. 3 is a view in side elevation and at a still further enlarged scale of a portion of the adhesive applying device.

The melting and feeding unit 40 comprises a melt body in the form of a metallic block 120 having a boss 122 projecting from its left-hand end, FIG. 3, and provided with a bore 124 which is in alignment with another bore 126 of the body. The body is cut away to form a recess 128 of the shape shown in FIG. 3 and which increases in width and decreases in depth from left to right so that a very narrow clearance space 130 (FIG. 6) is provided between the right-hand end of this recess and a generally rectangular recess 132 also formed in the block. A plate 134, held in place by screws 136, 136 covers these recesses and the mentioned screws also extend through spacing bushings 137, 137 to secure the block 120 to a supporting plate 138, FIG. 6. The block 120 is also provided with a vertical bore 140 which serves as a cylinder for a metering plunger 142 having a piston rod 144. This rod extends downwardly through a bore in a plate 146, secured to the lower side of the block 120. As shown in FIG. 3, this plate is provided with a shallow recess 150, slightly larger in diameter than the bore 140 and in alignment therewith, and with a groove 152 extending from this recess to the left-hand end of the plate 146.

The recess 132 is in communication with the bore 140 through suitable passages 160, 162 and 164 formed in the block 120, FIG. 3. A check valve 166 is yieldingly held against a valve seat 168, in the passage 162, by means of a coil spring 170 which is seated in a recess 172 formed in a block 174, threaded into a bore in the block 120 in alignment with the passage 162. At its upper end, the cylindrical bore 140 is enlarged, as indicated by the reference character 180 and received within this enlarged portion is a valve seat 182 and the cylindrical stem 184 of an albow fitting 186 having a passageway 188. Held yieldingly against the valve seat 182, by means of a coil spring 190, is a second check valve 192. The elbow fitting 186 is clamped in place, with its stem in the bore 180, by means of a clamp lever 183, fulcrumed on a screw stud 185 and engaged by a clamp screw 187.

Extending outwardly from the supporting plate 138 is an L-shaped flange 194, FIG. 2, to the lower portion of which there is secured a cylinder 200 in which there is received a piston 202 having an upwardly extending piston rod 204. The piston rods 204 and 144 are connected together by means of a coupling 206 having an integrally formed flange 208 provided with a conical camming surface 210. Also mounted on the supporting plate is a microswitch 212 having an operating roll 214 which is engaged by the surface 210 of the flange 208 of the coupling 206 when the piston 202, as well as the metering plunger 142, are in their lowermost positions, thus to move the switch 212 to open position. When fluid under pressure is admitted to the cylinder 200, beneath the piston 202, through a conduit 220, the piston 202 and the plunger 142 will be elevated, thereby to force molten adhesive from the cylindrical bore 140, past the check valve 192, through passage 188 and thence through the hose 116 and supply pipe 112, passages 114, 110 and 98, and out through the nozzle 60. The extent of such upward movement of the plunger 142 and hence the quantity of adhesive extruded through the nozzle may be varied by suitable adjustment of two stop nuts 222, 222 threaded onto the piston rod 144, in a manner which should be apparent.

Figure 6:
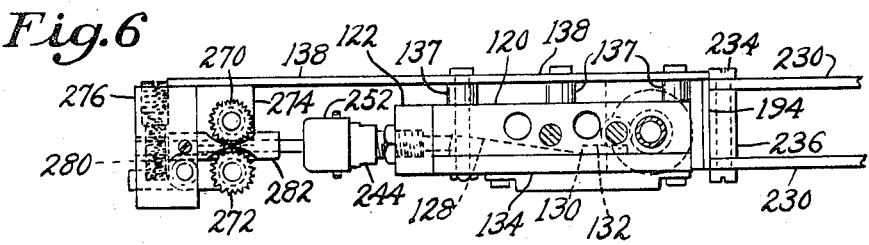
FIG. 6 is a plan view of a portion of the adhesive applying device.

Referring to FIGS. 2 and 6, the melting and feeding unit 40 is mounted on the sleeve 72 by means of two parallel plates 230, 230 secured to the sleeve by screws 232 and to the supporting plate 138 by means of screws 234, 234 which pass through these plates and also through a block 236 which is secured to the flange 194. Accordingly, it will be understood that the melting and feeding unit moves in a heightwise direction with the nozzle, during the operation of the lasting machine, when the nozzle is moved downwardly away from the bottom of the shoe S being lasted, see FIG. 1, just before the wipers of the lasting machine are advanced and closed. For thus moving the sleeve in a heightwise direction, a fluid pressure operated piston, not shown, is provided and this piston is connected to the sleeve 72 by means including a link 238, FIGS. 1 and 2.

Figure 4:
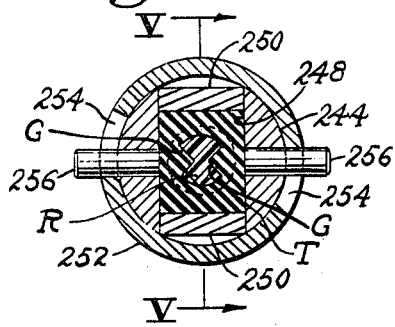
FIG. 4 is a view in section and at an enlarged scale, substantially on line IV—IV of FIG. 3 and looking in the direction of the arrows.
Figure 5:
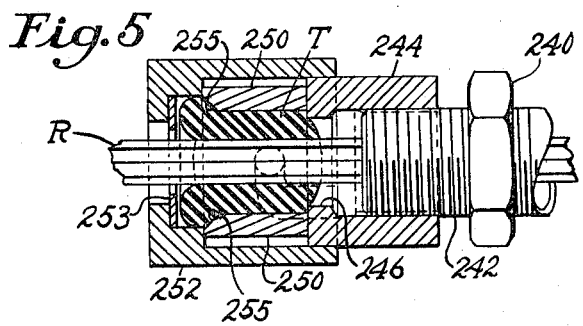
FIG. 5 is a view in section substantially on line V—V of FIG. 4 and looking in the direction of the arrows.

Threaded into the bore 124 is a fitting 240 having an externally threaded outer portion 242 on which there is mounted a sleeve 244 having an enlarged bore 246 and a transverse slot 248. Received within this slot is a normally round resiliently deformable tube of high temperature resistant rubber (e.g., "Viton," a copolymer of hexafluoropropylene and vinylidene fluoride) which is distorted into the shape shown in FIGS. 4 and 5, thus to snugly embrace a solid rod R of adhesive provided with diametrically opposed axial grooves G, G by the sides of the slot 248 and two pressure blocks 250, 250 held in place by an outer sleeve 252. An insulating washer 253 is provided to prevent contact of the rod R with this sleeve. This outer sleeve is held in place on the inner sleeve 244 by means of bayonet slots 254, 254 which cooperate with pins 256, 256. The blocks 250, 250 are beveled off, as indicated at 255, 255, so that the tube T flares out slightly, as shown in FIG. 5. Although thus snugly embraced by the distorted tube T, the leading end of the rod R of solid adhesive may be readily fed through this tube, the fitting 240, passageways 124 and 126 into the recess 128 of the melt body 120 where it is melted and from which it is delivered to the recess 132 and thence past the check valve 166 into the cylindrical bore 140. However, movement of the rod R in the opposite direction will be resisted as the tube tends to close and grip the rod frictionally.

For thus feeding the solid rod of adhesive, which is conveniently stored on a reel 260, suitably mounted in the lasting machine, FIG. 1, through a guide tube 262, a pair of feed wheels 270, 272 are provided, see FIG. 6. One of these feed wheels, 270, which serves as an idler, is mounted in a fixed bearing block 274, carried by a bracket 276 on the supporting plate 138 while the other feed wheel 272, which is driven by means including a flexible shaft 278, FIG. 1, is yieldingly urged into engagement with the rod R by means of a spring 280, these feed wheels engaging the rod through a cutaway portion of a guide 282. The flexible shaft 278 extends from the feed wheel 272 through a housing 284, to the output element 286 of an electromagnetic clutch, indicated generally by the reference character 290. The input element of this clutch is driven directly from the output of a speed reduction gear 292 associated with an electric motor 294. Preferably, and as shown in FIG. 1, the melting and feeding unit 40 is enclosed by a sheet metal cover, or housing, indicated by reference character 298.

Figure 9:
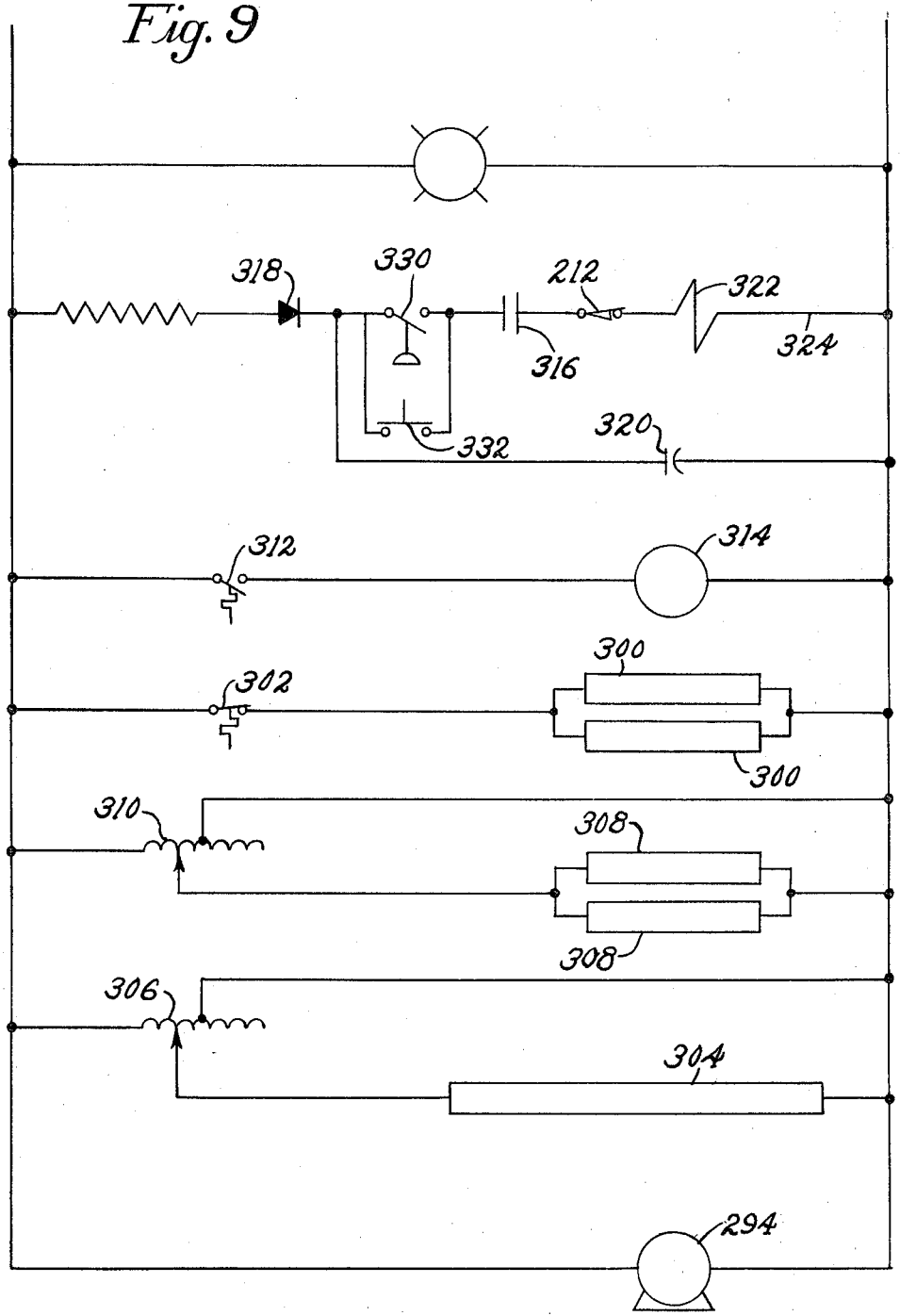
FIG. 9 is an electrical diagram.

Mounted within the block 120 are two electrical heating units 300, 300 which are connected to a suitable source of electrical energy through a thermostatic switch 302, as shown diagrammatically in FIG. 9. A rope type of electrical heater 304 is wound around the flexible metallic hose 116 and this heater is controlled by a rheostat 306 diagrammatically illustrated in FIG. 9, while the holder 66 and nozzle 60 are heated by means of electrical heaters 308, 308, one of which appears in FIG. 8, under the control of a rheostat 310, see FIG. 9. As shown in FIG. 2, the thermostatic switch 302 is mounted directly on the cover plate 134 and immediately adjacent thereto is another thermostatic switch 312 which controls the flow of electrical energy to the coil 314 of a relay having a normally open contact 316. A diode 318 and capacitance 320 are arranged to provide a source of direct current for the coil 322 of the electromagnetic clutch 290 through a line 324 in which switch 212 and relay contact 316, previously mentioned, and a pressure switch 330 are interposed. Paralleling the latter switch is a manually operated switch 332.

At the beginning of each operating cycle of the lasting machine, the sleeve 72 will be held in its lowermost position, as determined by the engagement of a part of the sleeve with a shoulder 350 on the shoe rest post 22, see FIG. 2, by means of the piston which is connected to the link 238. This piston, not shown, is arranged to perform the same functions with respect to the nozzle 60 as the cylinder 54 and spring, referred to in the Bowler et al. patent, columns 3 and 4, performed with respect to the insole holddowns 70, 70 in the patented machine, i.e., to elevate the sleeve thus to urge the nozzle against the bottom of a shoe on the shoe rest 20 and to move the sleeve downwardly to withdraw the nozzle from the insole. Accordingly, the flow of pressure fluid to and from this piston is controlled in the same manner as flow to and from cylinder 54 of the patented machine.

Still referring to the Bowler et al. patent, see especially columns 11 and 12, it will be understood that shortly after the lasting cycle has been initiated, lines 70–75, column 11, of the Bowler et al. patent, operating fluid under pressure will be admitted to cylinders arranged to effect movement of the wiper head to cause lasting wipers, diagrammatically illustrated in FIG. 1 and identified by reference character 360, to wipe the upper over the last. In the herein illustrated arrangement, the conduit 220, FIGS. 1 and 2, which is associated with the cylinder 200, is connected into this same pressure line so that when the wiper head is being lowered the metering plunger 142 will be elevated by piston 202 to extrude a measured quantity of molten thermoplastic adhesive out through the nozzle 60 and onto the toe end of the insole of the shoe S, diagrammatically shown in FIG. 1. As indicated above, the quantity of adhesive thus extruded may be varied by adjustment of the stop nuts 222. It will be understood, see column 11, lines 25–28, of the Bowler et al. patent, that before the lasting cycle was commenced, the sleeve 72 would have been elevated so that the nozzle 60 is held against the insole positively at one end by post 71, and yieldingly at its other end by springs 74, 74 and will have leveled itself thereon in the manner explained above.

As the plunger 142 moves upwardly, the switch 212 which had been held in open position by the camming surface 210 on the flange 208 will return to its normally closed position, as shown in FIG. 9. At a later point in the lasting cycle, a pilot valve corresponding to valve 592 of the Bowler et al. machine (see line 28, column 12) will be opened to admit operating fluid to the upper side of the piston connected to the link 238 thus causing the sleeve 72 to be moved downwardly to the position shown in FIG. 2 and the nozzle to be withdrawn from the insole to provide space for the wipers 360 to be advanced and closed during the latter part of the lasting cycle.

The pressure switch 330 which is connected into the line leading to the upper side of the last mentioned piston, will now be closed to energize the coil 322 of the clutch 290 (relay contact 316 having been previously closed when coil 314 was energized through thermostatic switch 312 as block 120 reached the desired temperature). Clutch 290 will now engage and the motor 294, which runs constantly during the use of the machine, will drive the feed wheel 272 to feed the leading end of the rod R into the chamber 128 where it is melted. The entering solid rod R will force molten adhesive from the chamber 128 into recess 132, through passages 160, 162, past the check valve 166 and into the bore 142 filling this bore and returning the plunger 142 to its lowermost position (conduit 220 at this time being connected to exhaust), thus recharging the device for the next operating cycle. When the plunger 142 reaches its lowermost position, switch 212 will be opened thus deenergizing the coil 322 and bringing the feed wheel 272 to a stop, thus completing an operating cycle of the adhesive applying device.

Having described my invention, what I claim as new and desire to secure by Letters Patent of the United States is:

1. In a device for handling adhesive in the form of a solid rod of indefinite length comprising a metallic casing formed to provide a melting chamber, a discharge passageway leading from said chamber and an inlet passage leading into said chamber, means for heating said casing so that the leading end of a solid rod of adhesive is melted as it is fed into said chamber through the inlet passageway and molten adhesive is forced out through the discharge passageway by the entering solid rod, and a guiding and sealing means associated with said inlet passage including a body of resilient deformable high temperature resistant material, and means for deforming said body snugly to embrace the rod as it is fed into the inlet passageway.

2. In a device for handling adhesive in the form of a solid rod of indefinite length comprising a metallic casing formed to provide a melting chamber, a discharge passageway leading from said chamber and an inlet passage leading into said chamber, means for heating said casing so that the leading end of a solid rod of adhesive is melted as it is fed into said chamber through the inlet passageway and molten adhesive is forced out through the discharge passageway by the entering solid rod, and a guiding and sealing means associated with said inlet passage including a sleeve member mounted in the casing and having a bore in alignment with the inlet passageway, a slot extending transversely of the sleeve and across the bore therein, a body of resilient deformable high temperature resistant material within said bore, and means associated with the sleeve and slot for causing said body snugly to embrace the rod as it is fed into the inlet passageway.

3. An adhesive applying apparatus for use in a lasting machine having lasting instrumentalities, and a shoe rest for supporting a shoe in position to be lasted, comprising a supporting member adapted to be mounted for movement relatively to the shoe rest, a nozzle mounted on the supporting member, an adhesive melting and extruding means also mounted on the supporting member, and a flexible heated hose connecting the nozzle to the melting and extruding means, said adhesive melting and extruding means comprising a heated metallic casing formed to provide a melting chamber, a discharge passageway in communication with said melting chamber and heated hose and hence with the nozzle and an inlet passageway leading into the melting chamber, and means for feeding the leading end of a solid rod of adhesive through the inlet passageway and into the melting chamber, said inlet passage being provided with a guiding and sealing means including a body of resilient deformable high temperature resistant material, and means for deforming said body snugly to embrace the solid rod of adhesive as it is fed therethrough and through the inlet passage into the melting chamber.

4. An apparatus according to claim 3 in which said casing is provided with a sleeve member having a bore in alignment with the inlet passage, a slot extending transversely of the sleeve and across the bore, said body being received in said bore, and means in said slot for causing said body snugly to embrace the solid rod as it is fed therethrough and through the inlet passage into the melting chamber.

References Cited

UNITED STATES PATENTS

| Re. 25,596 | 6/1964 | Weinschenk. | |
| 2,301,202 | 11/1942 | Dixon | 118—410 X |
| 2,871,818 | 2/1959 | Jorgensen | 118—410 X |
| 2,972,670 | 2/1961 | Dorosz et al. | 118—410 X |
| 3,251,081 | 2/1966 | Springer | 118—410 X |

WALTER A. SCHEEL, *Primary Examiner.*

JOHN P. McINTOSH, *Assistant Examiner.*